US011230002B2

(12) United States Patent
Inoue et al.

(10) Patent No.: US 11,230,002 B2
(45) Date of Patent: Jan. 25, 2022

(54) ROBOT

(71) Applicant: FANUC CORPORATION, Yamanashi (JP)

(72) Inventors: Toshihiko Inoue, Yamanashi (JP); Tomoyuki Motokado, Yamanashi (JP); Tooru Nagai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 48 days.

(21) Appl. No.: 16/784,651

(22) Filed: Feb. 7, 2020

(65) Prior Publication Data

US 2020/0290197 A1 Sep. 17, 2020

(30) Foreign Application Priority Data

Mar. 11, 2019 (JP) .............................. JP2019-043514

(51) Int. Cl.
  *B25J 9/00* (2006.01)
  *F16H 1/14* (2006.01)
  (Continued)

(52) U.S. Cl.
  CPC .......... *B25J 9/0009* (2013.01); *B25J 19/0029* (2013.01); *F16H 1/145* (2013.01); *F16H 1/06* (2013.01)

(58) Field of Classification Search
  CPC ....... B25J 9/0009; B25J 19/0029; B25J 9/102
  See application file for complete search history.

(56) References Cited

U.S. PATENT DOCUMENTS 6,250,174 B1 * 6/2001 Terada ..................... B25J 9/047
                                                     414/918
10,093,024 B2 * 10/2018 Inoue ................... B25J 19/0025
                                (Continued)

FOREIGN PATENT DOCUMENTS

EP     1129828 A1 *  9/2001  .............. B25J 9/046
EP     1892064 A1    2/2008
                                (Continued)

OTHER PUBLICATIONS

Japanese Office Action dated May 11, 2021, in connection with corresponding JP Application No. 2019-043514 (9 pp., including machine-generated English translation).

(Continued)

*Primary Examiner* — Bobby Rushing, Jr.
(74) *Attorney, Agent, or Firm* — Maier & Maier, PLLC

(57) ABSTRACT

A robot includes: a base; a swivel body supported rotatable about a first axis; a first arm supported rotatable about a second axis perpendicular to the first axis; a second arm supported rotatable about a third axis parallel to the second axis; and a first wrist element supported rotatable about a fourth axis perpendicular to the third axis and disposed in a same plane as the first axis. A first hollow section penetrating along the first axis is provided in the base and the swivel body; a second hollow section penetrating along the fourth axis is provided in the first wrist element; the first and second arms have shapes allowing a linear object having passed through the first hollow section to be guided to the second hollow section via a space extending along a line connecting intersections of the first and second axes and the third and fourth axes.

11 Claims, 11 Drawing Sheets

(51) Int. Cl.
  *B25J 19/00* (2006.01)
  *F16H 1/06* (2006.01)

(56) References Cited

U.S. PATENT DOCUMENTS

| | | | |
|---|---|---|---|
| 2006/0101936 A1 | 5/2006 | Inoue et al. | |
| 2006/0156852 A1* | 7/2006 | Haniya | B25J 9/102 |
| | | | 74/490.03 |
| 2008/0056859 A1 | 3/2008 | Inoue et al. | |
| 2009/0314120 A1 | 12/2009 | Larsson | |
| 2010/0162845 A1 | 7/2010 | Yonehara et al. | |
| 2012/0000312 A1 | 1/2012 | Collmer | |
| 2012/0312116 A1 | 12/2012 | Yonehara et al. | |
| 2014/0318298 A1 | 10/2014 | Inoue | |
| 2016/0101518 A1 | 4/2016 | Kabushiki et al. | |
| 2017/0274524 A1 | 9/2017 | Inoue et al. | |
| 2017/0282358 A1 | 10/2017 | Inoue et al. | |
| 2017/0282382 A1 | 10/2017 | Inoue et al. | |
| 2017/0291313 A1 | 10/2017 | Inoue et al. | |
| 2018/0021960 A1* | 1/2018 | Grant | B25J 17/0283 |
| | | | 74/490.06 |
| 2018/0333844 A1* | 11/2018 | Inoue | B23K 9/12 |
| 2019/0022936 A1* | 1/2019 | Mansson | B25J 15/0019 |
| 2019/0160694 A1 | 5/2019 | Inoue et al. | |

FOREIGN PATENT DOCUMENTS

| | | |
|---|---|---|
| EP | 2213425 A1 | 8/2010 |
| JP | 561-121882 A | 6/1986 |
| JP | H01-257592 A | 10/1989 |
| JP | H03-121791 A | 5/1991 |
| JP | H08141974 A | 6/1996 |
| JP | 2004136371 A | 5/2004 |
| JP | 2006051581 A | 2/2006 |
| JP | 2008-073833 A | 4/2008 |
| JP | 2012-519081 A | 8/2012 |
| JP | 2014-213437 A | 11/2014 |
| JP | 2014-237206 A | 12/2014 |
| JP | 5702826 B2 | 4/2015 |
| JP | 2015-112707 A | 6/2015 |
| JP | 2017170558 A | 9/2017 |
| JP | 2017-185573 A | 10/2017 |
| JP | 2017-185597 A | 10/2017 |
| JP | 2017185574 A | 10/2017 |
| JP | 2019-093489 A | 6/2019 |
| WO | 2008/077896 A1 | 7/2008 |
| WO | 2009/069389 A1 | 6/2009 |
| WO | 2015001643 A1 | 1/2015 |
| WO | 2018123895 A1 | 7/2018 |

OTHER PUBLICATIONS

Japanese Search Report dated Apr. 21, 2021, in connection with corresponding JP Application No. 2019-043514 (28 pp., including machine-generated English translation).

* cited by examiner

ROBOT

CROSS-REFERENCE TO RELATED APPLICATIONS

This application is based on Japanese Patent Application No. 2019-043514, the content of which is incorporated herein by reference.

FIELD

The present disclosure relates to a robot.

BACKGROUND

As a structure of a robot that includes an arm that is rotated about a horizontal axis, there is a generally known structure in which a motor and a reducer that are coaxially disposed on an axis connect a swivel body and an arm, or between arms, and rotationally drive the arm with respect to the swivel body or the other arm (for example, see PCT International Publication No. WO 2009/069389).

SUMMARY

One aspect of the present disclosure is directed to a robot including: a base that is fixed to an installation surface; a swivel body that is supported so as to be rotatable about a first axis with respect to the base; a first arm that is supported so as to be rotatable about a second axis perpendicular to the first axis, with respect to the swivel body; a second arm that is supported so as to be rotatable about a third axis parallel to the second axis, with respect to the first arm; and a first wrist element that is supported so as to be rotatable about a fourth axis perpendicular to the third axis and disposed in the same plane as the first axis, with respect to the second arm. A first hollow section that penetrates along the first axis is provided in the base and the swivel body; a second hollow section that penetrates along the fourth axis is provided in the first wrist element; and the first arm and the second arm have shapes that allow a linear object that has passed through the first hollow section to be guided to the second hollow section via a space extending along a straight line that connects the intersection of the first axis and the second axis and the intersection of the third axis and the fourth axis.

DETAILED DESCRIPTION

A robot 1 according to one embodiment of the present disclosure will be described below with reference to the drawings.

Figure 1:
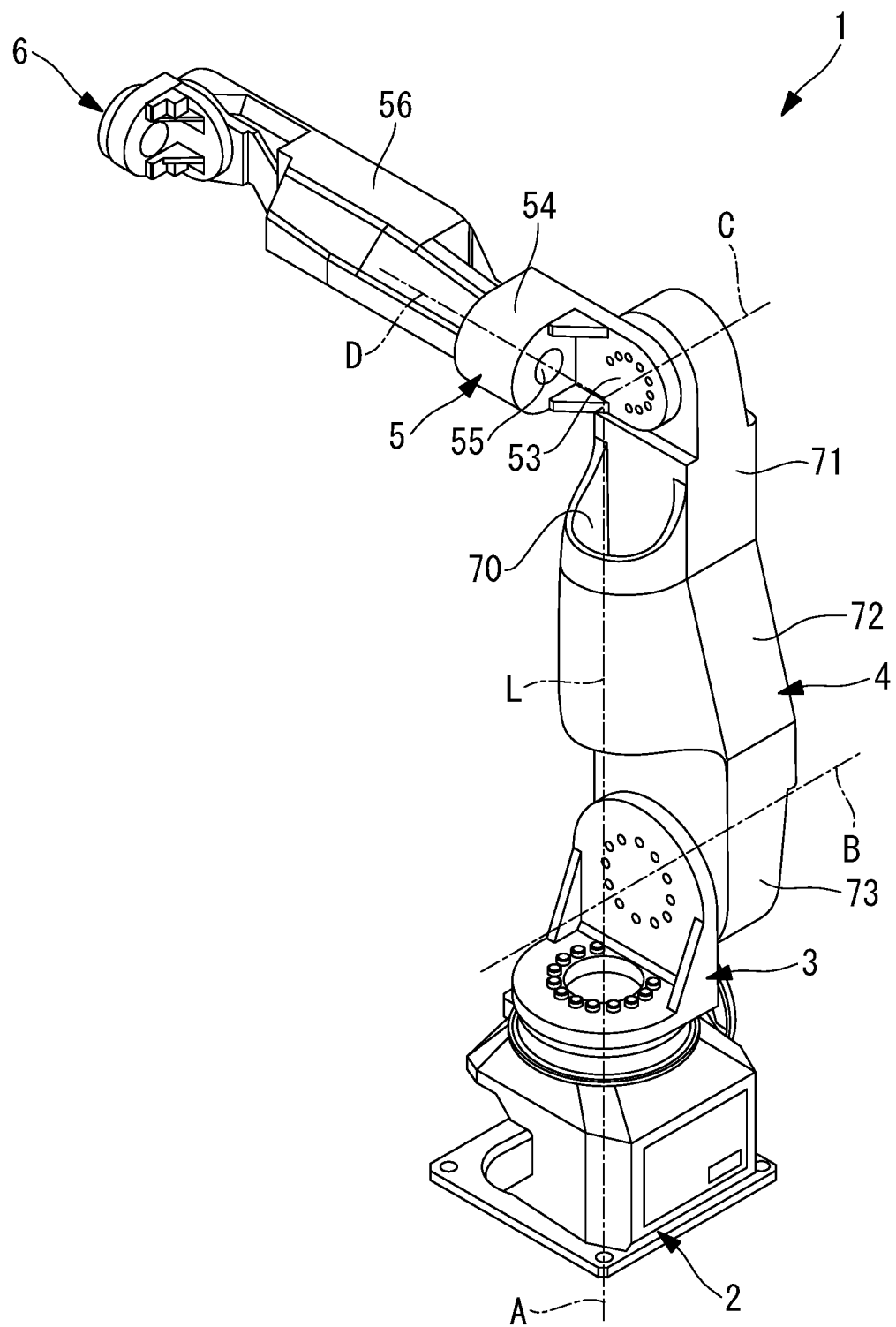
FIG. 1 is a perspective view of a robot according to one embodiment of the present disclosure, viewed from the left back side.
Figure 2:
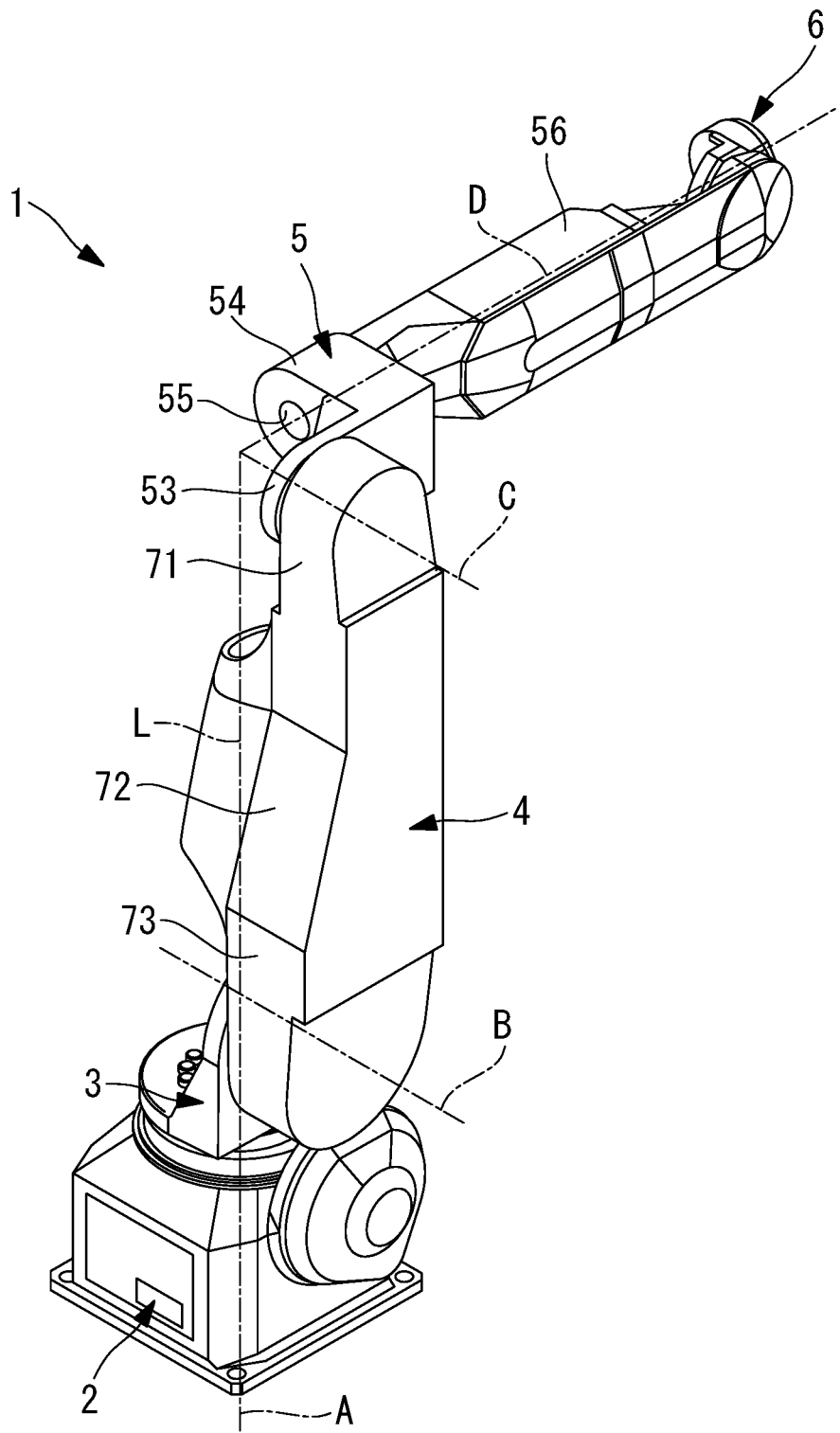
FIG. 2 is a perspective view of the robot shown in FIG. 1, viewed from the right back side.
Figure 3:
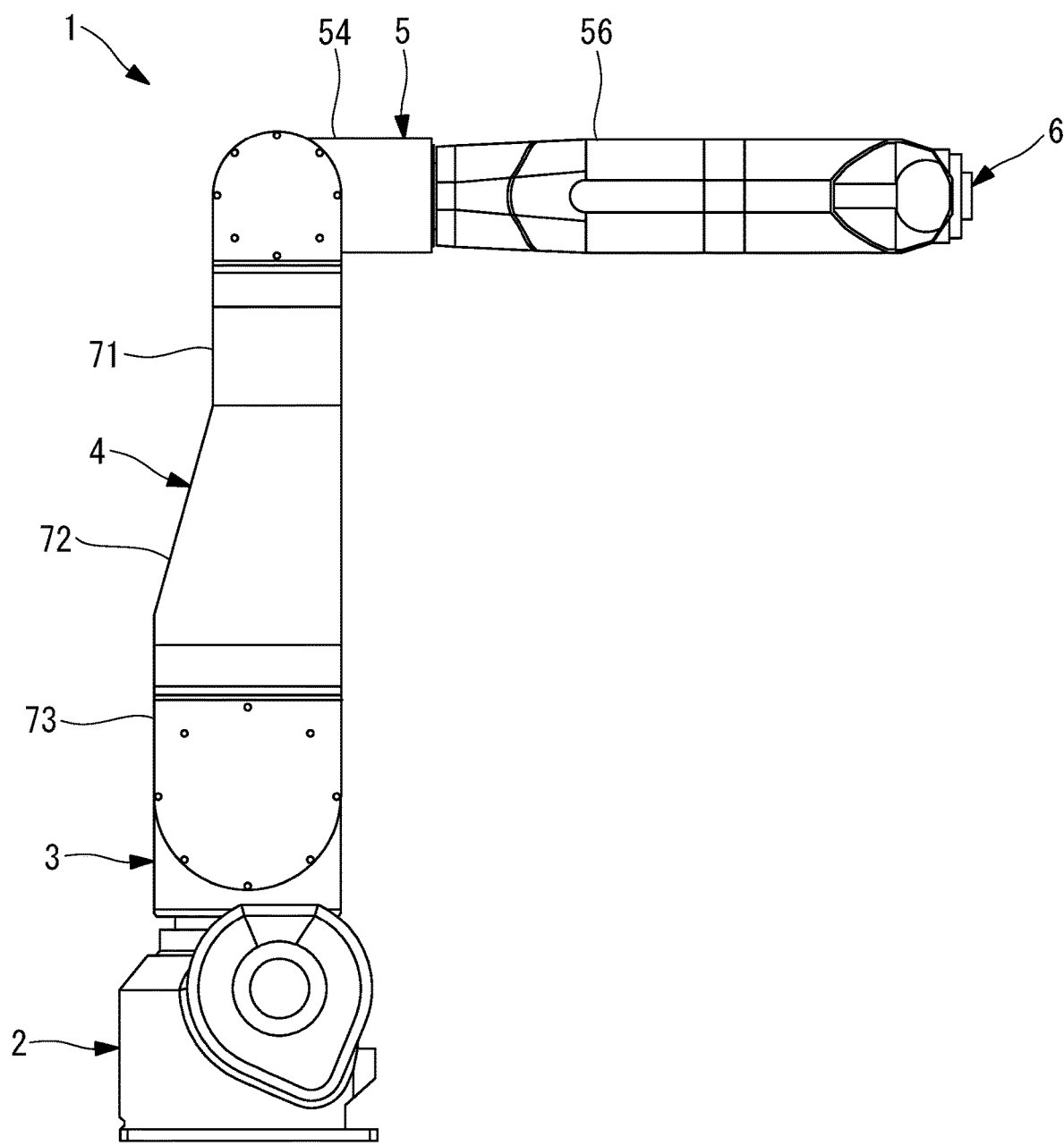
FIG. 3 is a side view of the robot shown in FIG. 1, viewed from the right side.

As shown in FIGS. 1 to 3, the robot 1 of this embodiment is a 6-axis articulated type robot.

The robot 1 includes: a base 2 that is installed on a floor surface (installation surface); and a swivel body 3 that is supported so as to be rotatable about a vertical first axis A, with respect to the base 2. Furthermore, the robot 1 includes: a first arm 4 that is supported so as to be swivelable about a horizontal second axis B, with respect to the swivel body 3; and a second arm 5 that is supported at a distal end of the first arm 4 so as to be swivelable about a horizontal third axis C. Furthermore, the robot 1 includes a 3-axis wrist unit 6 that is supported at a distal end of the second arm 5.

Figure 4:
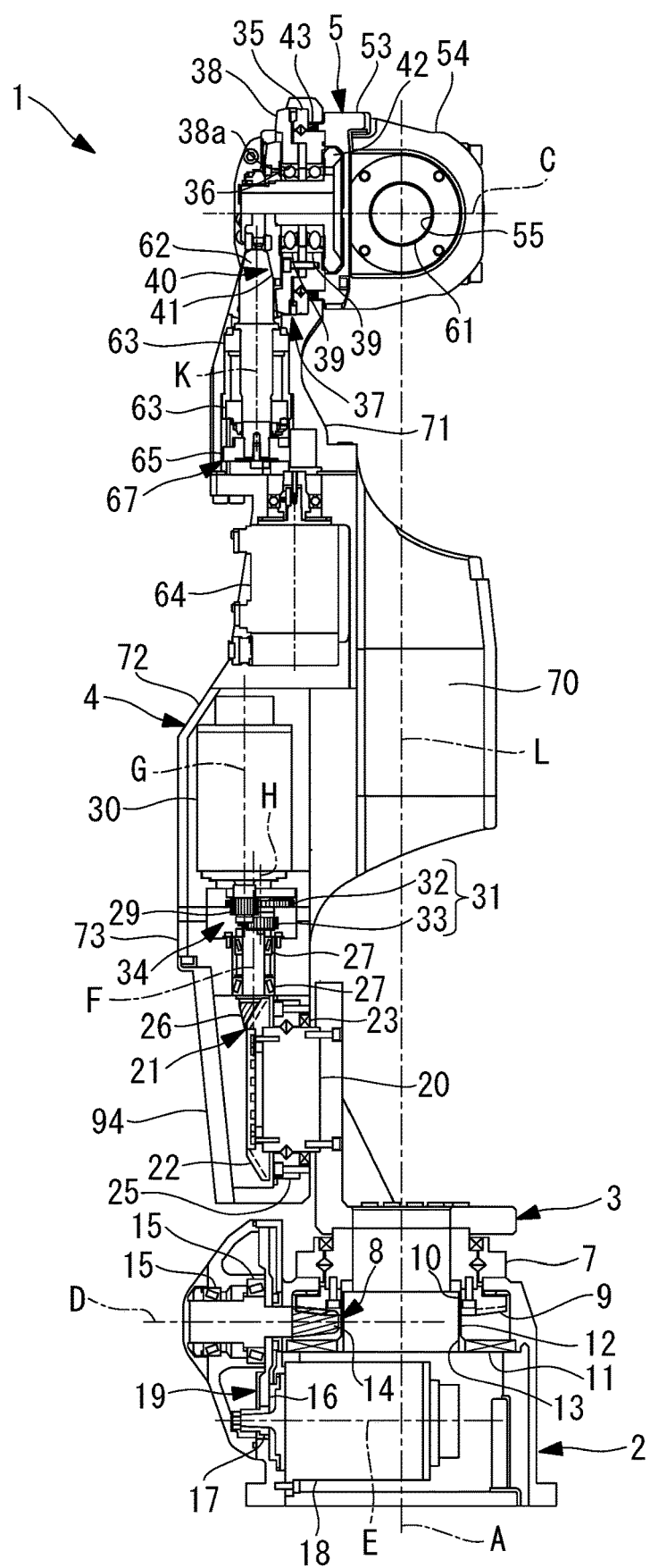
FIG. 4 is a longitudinal sectional view of the robot shown in FIG. 1, viewed from the front side.

As shown in FIG. 4, the swivel body 3 is supported, by a bearing 7, on an upper side of the base 2 so as to be rotatable about the first axis A. A ring gear 9 that constitutes a first hypoid gear set 8 is fixed below the swivel body 3.

A through-hole 10 is provided at the center of the ring gear 9, and a cylindrical member 12 that forms an oil box together with an oil seal 11 disposed between the cylindrical member 12 and an inner surface of the base 2 is fixed in the through-hole 10. The cylindrical member 12 has a wall thickness that is set sufficiently small in a radial direction, so that an inner hole 13 having a sufficient diameter is provided therein.

As shown in FIG. 4, the first hypoid gear set 8 includes a pinion gear 14 and the ring gear 9 that are engaged with each other in the oil box. The pinion gear 14 is supported, by bearings 15, at a side of the base 2 so as to be rotatable about a horizontal axis D. A large gear 16 that is formed of a spur gear is fixed to the pinion gear 14. Furthermore, a drive motor 18 that rotates the swivel body 3 is disposed inside the base 2, with an axis E of the shaft thereof being parallel to an axis D of the pinion gear 14. A small gear 17 that is formed of a spur gear engaged with the large gear 16 is fixed to the shaft of the drive motor 18.

The rotation of the drive motor 18 is first speed-reduced by a transmission mechanism 19 that is constituted by the small gear 17 and the large gear 16, is again speed-reduced by the engagement of the pinion gear 14 and the ring gear 9, and is transmitted to the swivel body 3. Engagement of the first hypoid gear set 8, the small gear 17, and the large gear 16 is sufficiently lubricated in the oil box.

The drive motor 18, which rotates the swivel body 3, is disposed at a position shifted in the horizontal direction with respect to the inner hole 13, which is provided along the first axis A. Accordingly, a large cross-sectional path (first hollow section) that penetrates in the vertical direction in the vicinity of the first axis A is formed from the inside of the base 2 to a space above the swivel body 3.

Figure 5:
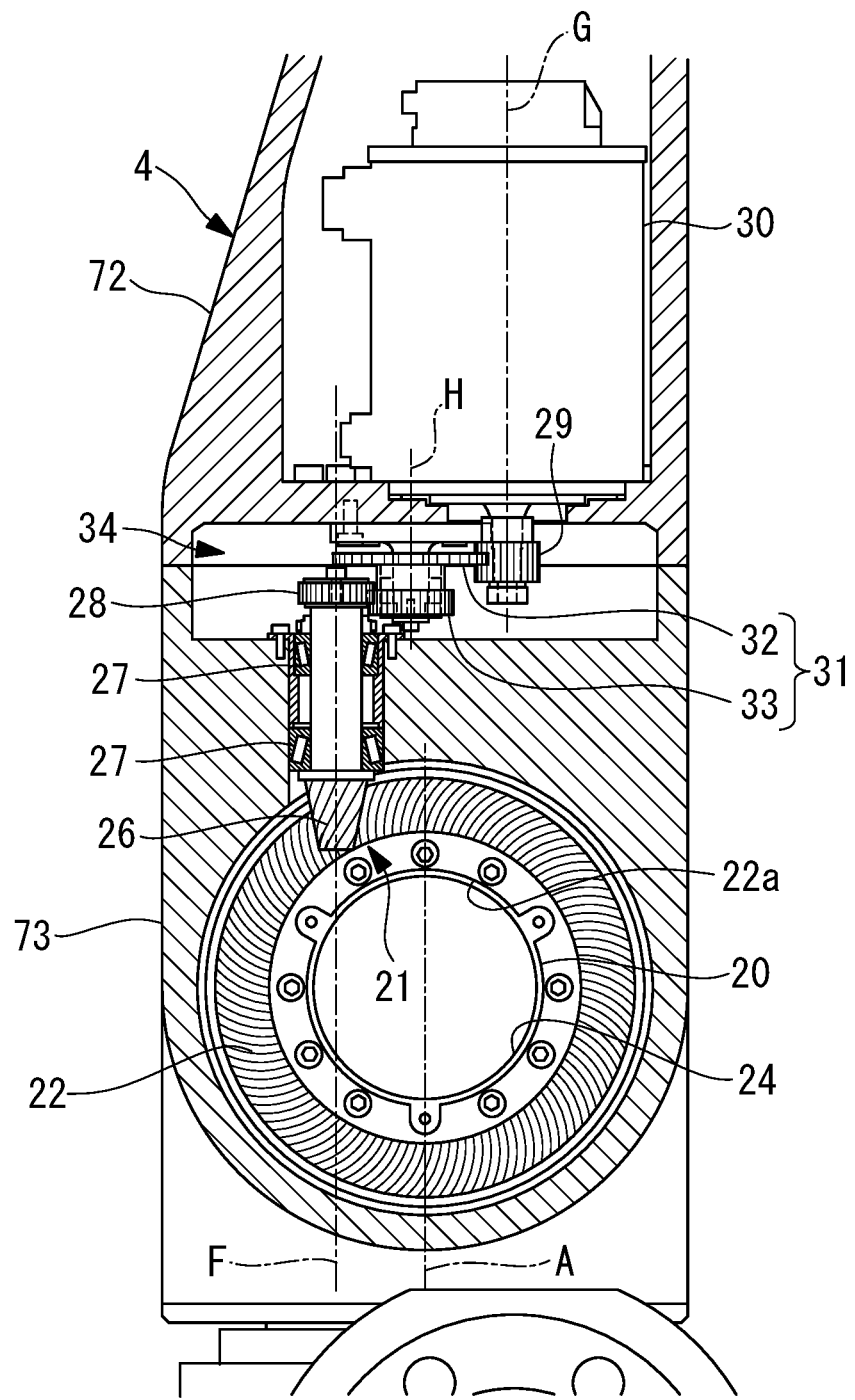
FIG. 5 is a partial longitudinal sectional view showing surroundings around a second axis, when the robot shown in FIG. 1 is viewed from the right side.

As shown in FIGS. 4 and 5, the first arm 4 is supported, by a bearing 25, on the swivel body 3 so as to be rotatable about the second axis B, which is perpendicular to the first axis A at one point. A column member 20 that forms an inner ring of the bearing 25 is fixed to the swivel body 3 so as to be coaxial with the second axis B. A ring gear 22 that constitutes a second hypoid gear set 21 is fixed to a distal end of the column member 20.

A space between the column member 20 and an inner surface of the first arm 4 is sealed by an oil seal 23.

The second hypoid gear set 21 includes the ring gear 22 and a pinion gear 26 that is engaged with the ring gear 22. The pinion gear 26 is supported, by bearings 27, in the first arm 4 so as to be rotatable about an axis F that is disposed in a plane perpendicular to the second axis B and that is parallel to the longitudinal direction of the first arm 4. A spur gear 28 is fixed to the pinion gear 26.

Furthermore, a drive motor 30 that rotates the first arm 4 is disposed inside the first arm 4, with an axis G of the shaft thereof being parallel to the axis F of the pinion gear 26. A spur gear 29 is fixed to the shaft of the drive motor 30.

An intermediate gear 31 that is supported in the first arm 4 so as to be rotatable about an axis H parallel to the axis G of the shaft of the drive motor 30 and the axis F of the pinion gear 26 is disposed between the spur gear 29, which is fixed to the shaft of the drive motor 30, and the spur gear 28, which is fixed to the pinion gear 26. The intermediate gear 31 includes: a large gear 32 that is engaged with the spur gear 29 on the shaft of the drive motor 30; and a small gear 33 that is engaged with the spur gear 28 on the pinion gear 26, with the large gear 32 and the small gear 33 being coaxially disposed. The two pairs of the gears 29 and 32 and the gears 28 and 33 constitute a transmission mechanism 34 that speed-reduces the rotation of the drive motor 30 and that transmits the rotation to the pinion gear 26.

The rotation of the drive motor 30 is first speed-reduced by the transmission mechanism 34, is again speed-reduced by the engagement of the pinion gear 26 and the ring gear 22, and is transmitted to the first arm 4. The engagement of the second hypoid gear set 21 and the transmission mechanism 34 is sufficiently lubricated in an oil box sealed by a lid member 94 that is fixed to the first arm 4 and by the above-mentioned oil seal 23.

As shown in FIG. 1, the first arm 4 includes, at a position surrounding a longitudinal axis L disposed in a plane that includes the first axis A and that is perpendicular to the second axis B, a hollow section 70 penetrating along the longitudinal axis L.

Figure 6:
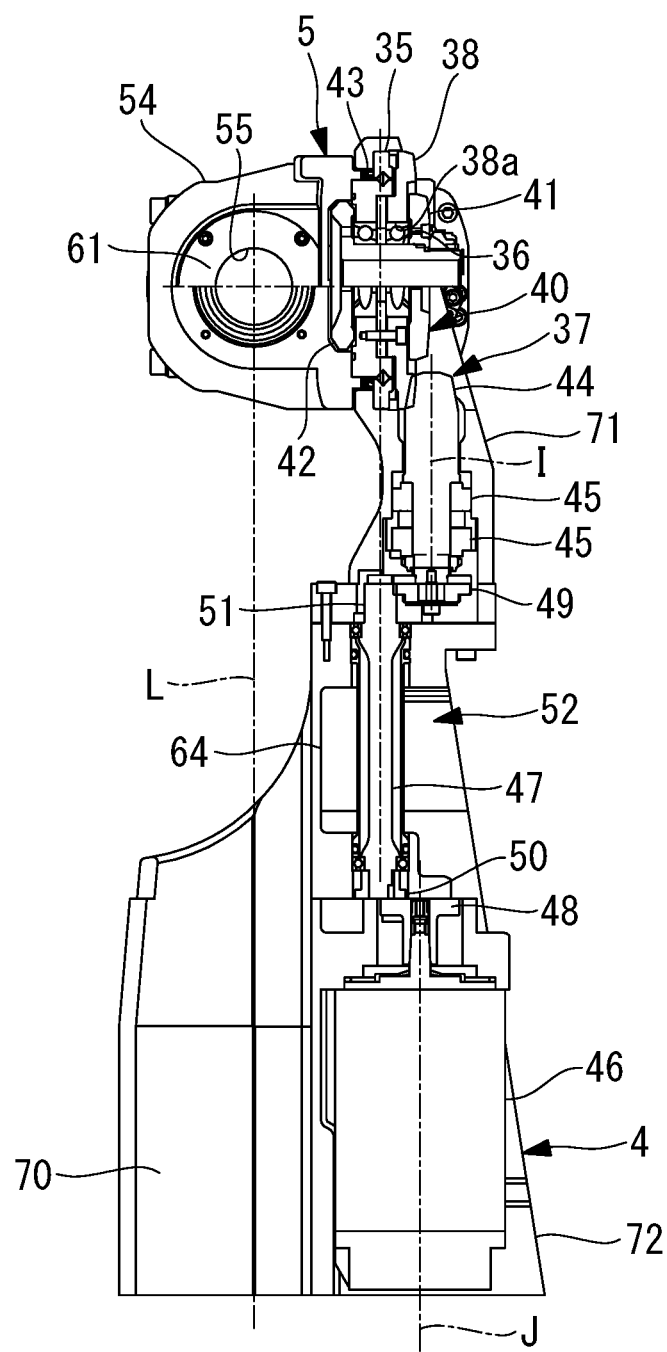
FIG. 6 is a partial longitudinal sectional view showing a vicinity of a third axis of a first arm, when the robot shown in FIG. 1 is viewed from the front side.

As shown in FIGS. 4 and 6, the second arm 5 is supported, by a bearing 35, on an upper side of the first arm 4 so as to be rotatable about the third axis C, which is parallel to the second axis B, with respect to the first arm 4. A ring gear (output hypoid gear) 38 that is disposed coaxially with the third axis C and that constitutes a third hypoid gear set (reducer mechanism) 37 is fixed to the second arm 5.

A through-hole 38a is provided at the center of the ring gear 38, and a shaft 36 that is disposed coaxially with the third axis C is supported, by bearings 39, in the through-hole 38a so as to be rotatable about the third axis C. A ring gear (output hypoid gear) 41 that constitutes a fourth hypoid gear set (reducer mechanism) 40 is fixed to one end of the shaft 36. A drive-side bevel gear 42 is fixed to the other end of the shaft 36.

An oil seal 43 is disposed between the bearing 35, which is fixed to the second arm 5, and the inner surface of the first arm 4. A lid member (not shown) that blocks a space in which the third hypoid gear set 37 and the fourth hypoid gear set 40 are accommodated is detachably attached to the first arm 4. The space sealed by the lid member (not shown) and the oil seal 43 serves as an oil box.

The third hypoid gear set 37 includes a pinion gear (input hypoid gear) 44 and the ring gear 38 that are engaged with each other in the oil box. The pinion gear 44 is supported, by bearings 45, in the first arm 4 so as to be rotatable about an axis I that extends along a plane perpendicular to the third axis C and that extends along the longitudinal direction of the first arm 4.

Figure 7:
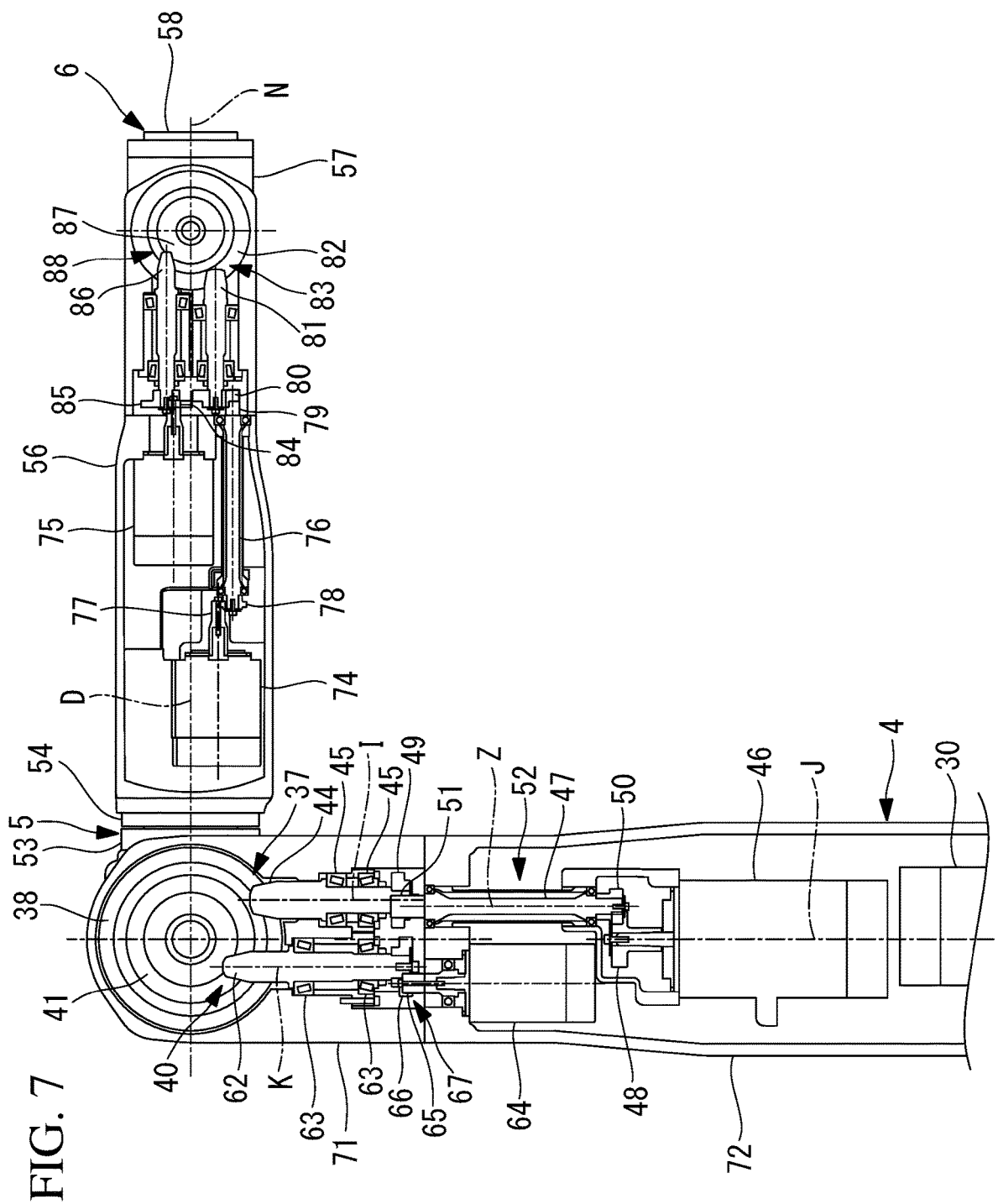
FIG. 7 is a partial longitudinal sectional view showing the first arm and a first wrist element, when the robot shown in FIG. 1 is viewed from the right side.

As shown in FIG. 7, a drive motor 46 that rotates the second arm 5 is disposed inside the first arm 4, with an axis J of the shaft of the drive motor 46 being parallel to the axis I of the pinion gear 44. A drive shaft 47 that is supported so as to be rotatable about an axis Z parallel to the pinion gear 44 is disposed between the drive motor 46 and the pinion gear 44. A spur gear 50 that is engaged with a spur gear 48 provided on the shaft of the drive motor 46 and a spur gear 51 that is engaged with a spur gear 49 provided at the other end of the pinion gear 44 are provided at both ends of the drive shaft 47.

Specifically, a transmission mechanism 52 is constituted by: the spur gear (small gear) 48, which is fixed to the shaft of the drive motor 46, and the spur gear (large gear) 50, which is provided at one end of the drive shaft 47, the spur gear 48 and the spur gear 50 being engaged with each other; the drive shaft 47; and the spur gear 51, which is provided at the other end of the drive shaft 47, and the spur gear 49, which is provided at the other end of the pinion gear 44, the spur gear 51 and the spur gear 49 being engaged with each other. The rotation of the drive motor 46 is first speed-reduced by the transmission mechanism 52, is again speed-reduced by the engagement of the pinion gear 44 and the ring gear 38, and is transmitted to the second arm 5.

As shown in FIG. 1, the second arm 5 includes a disc-shaped first section 53 that is centered on the third axis C and a cylinder-shaped second section 54 that is disposed so as to be perpendicular to the first section 53. The second section 54 is disposed at a position offset in one direction with respect to the third axis C and has, in a region centered on a fourth axis D, a through-hole 55 penetrating in the direction along the fourth axis D.

Figure 8:
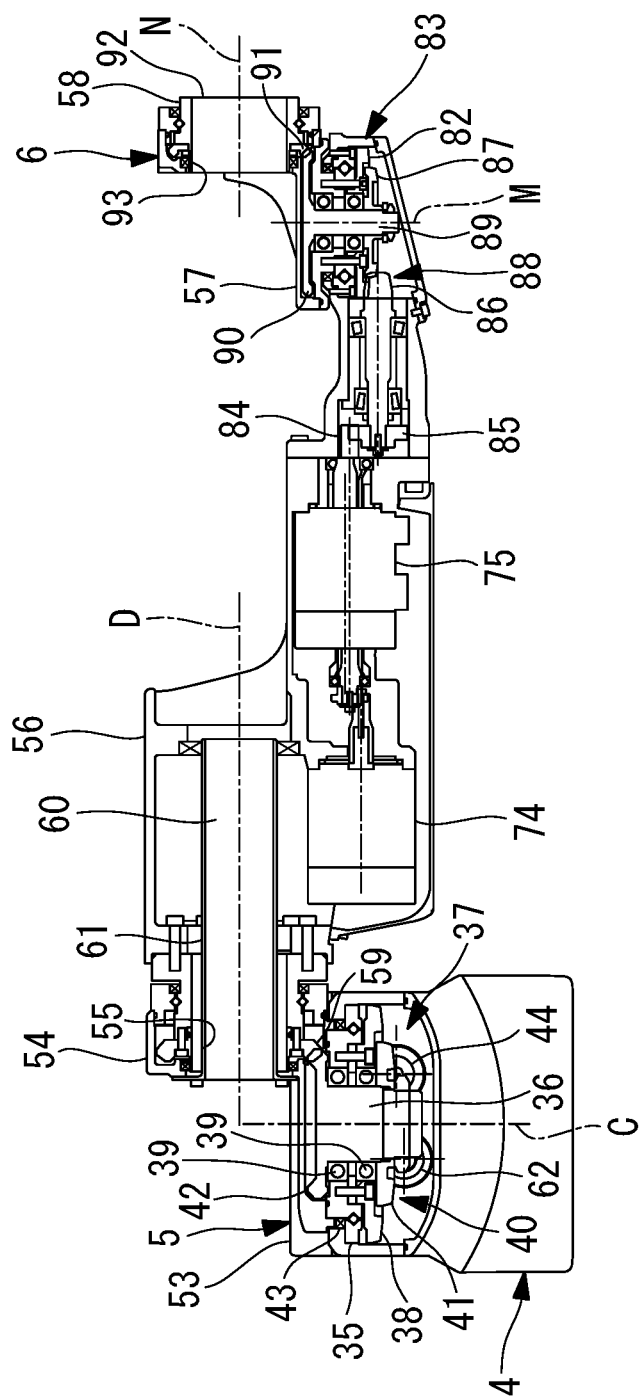
FIG. 8 is a longitudinal sectional view showing a second arm and a wrist unit, when the robot shown in FIG. 1 is viewed from the top.

As shown in FIG. 8, the wrist unit 6 includes a first wrist element 56 that is supported on the second section 54 of the second arm 5 so as to be rotatable about the fourth axis D, which is perpendicular to the third axis C in a plane containing the first axis A. Furthermore, the wrist unit 6 includes, at a distal end of the first wrist element 56, a second wrist element 57 that is supported so as to be rotatable about a fifth axis M perpendicular to the fourth axis D, with respect to the first wrist element 56. Furthermore, the wrist unit 6 includes a third wrist element 58 that is supported so as to be rotatable about a sixth axis N perpendicular to the fifth axis M and intersecting the fourth axis D and the fifth axis M at one point, with respect to the second wrist element 57.

A driven-side bevel gear 59 that is engaged with the drive-side bevel gear 42 is fixed at a base end of the first wrist element 56. Furthermore, the first wrist element 56 is provided with a hollow section (second hollow section) 60 that penetrates along the fourth axis D and that communicates with the through-hole 55 of the second arm 5. A cylindrical member 61 that penetrates the through-hole 55 and the hollow section 60 of the first wrist element 56 in the direction along the fourth axis D is disposed in the second arm 5.

As shown in FIG. 7, the fourth hypoid gear set 40 includes the ring gear (output hypoid gear) 41 and a pinion gear (input hypoid gear) 62. The pinion gear 62 is supported, by bearings 63, in the first arm 4 so as to be rotatable about an axis K parallel to the axis I of the pinion gear 44, which constitutes the third hypoid gear set 37.

As shown in FIGS. 7 and 8, a drive motor 64 that drives the first wrist element 56 is disposed inside the first arm 4 so as to be parallel to the axis K of the pinion gear 62. Spur gears (small gear, large gear) 65 and 66 that are engaged with each other are provided on the shaft of the drive motor 64 and on the pinion gear 62, respectively. These spur gears 65 and 66 constitute a transmission mechanism 67.

Specifically, the rotation of the drive motor 64 is first speed-reduced by the transmission mechanism 67, is again speed-reduced by the engagement of the pinion gear 62 and the ring gear 41, and is transmitted to the first wrist element 56 by the engagement of the drive-side bevel gear 42 and the driven-side bevel gear 59.

As shown in FIGS. 4, 5, and 7, the first arm 4 is divided into three sections at two positions in the longitudinal direction and is composed of, in order from the third axis C, a first arm section 71, a second arm section 72, and a third arm section 73 that are detachably attached to each other.

A division surface between the first arm section 71 and the second arm section 72 and a division surface between the second arm section 72 and the third arm section 73 are each disposed at such a position as to divide the corresponding oil box, which accommodates the transmission mechanisms 52 and 67 or the transmission mechanism 34, into two parts in the longitudinal-axis direction.

Specifically, the third arm section 73 is supported, by the bearing 25, on the swivel body 3 so as to be rotatable about the second axis B and rotatably supports the pinion gear 26 and the spur gear 28, which is fixed to the pinion gear 26, by means of the bearings 27.

The drive motor 30, which drives the first arm 4, the drive motor 46, which drives the second arm 5, and the drive motor 64, which drives the first wrist element 56, are fixed in the second arm section 72. Furthermore, the second arm section 72 rotatably supports the drive shaft 47 in a state in which the spur gear 48, which is fixed to the shaft of the drive motor 46, is engaged with the spur gear 50.

The first arm section 71 supports the second arm 5 so as to be rotatable about the third axis C by means of the bearing 35 and accommodates the third hypoid gear set 37 and the fourth hypoid gear set 40.

When the second arm section 72 is joined to the third arm section 73, the small gear 33 of the intermediate gear 31, which is attached to the second arm section 72, and the spur gear 28 of the pinion gear 26, which is attached to the third arm section 73, are appropriately engaged, while adjusting the engagement therebetween.

Furthermore, when the first arm section 71 is joined to the second arm section 72, the spur gear 65 on the drive motor 64 and the spur gear 51 on the drive shaft 47, which are attached to the second arm section 72, are respectively appropriately engaged with the spur gears 49 and 66 on the two pinion gears 44 and 62, which are attached to the first arm section 71, while adjusting the engagement therebetween.

When the second arm section 72 is joined to the third arm section 73, the oil box for accommodating the transmission mechanism 34 is formed therebetween in a sealed state. Furthermore, when the first arm section 71 is joined to the second arm section 72, the oil box for accommodating the transmission mechanisms 52 and 67 is formed therebetween in a sealed state.

As shown in FIG. 7, two drive motors 74 and 75 that drive the second wrist element 57 and the third wrist element 58, respectively, are accommodated inside the first wrist element 56. The rotation of the drive motor 74 is speed-reduced by a drive shaft 76 and four spur gears 77, 78, 79, and 80, the spur gears 77 and 78 forming a spur-gear pair and the spur gears 79 and 80 forming a spur-gear pair at both ends of the drive shaft 76, and is transmitted to a pinion gear 81. The pinion gear 81 and a ring gear 82 that is fixed to the second wrist element 57 constitute a fifth hypoid gear set 83. Accordingly, the second wrist element 57 is rotated about the fifth axis M, which is perpendicular to the fourth axis D, with respect to the first wrist element 56.

Furthermore, as shown in FIG. 8, the rotation of the drive motor 75 is speed-reduced by spur gears 84 and 85 that form a spur-gear pair and is transmitted to a pinion gear 86. A sixth hypoid gear set 88 is constituted by the pinion gear 86 and a ring gear 87 that is located at one end of a shaft 89 supported so as to be rotatable about the fifth axis M. A drive-side bevel gear 90 is fixed to the other end of the shaft 89, and the rotation transmitted to the shaft 89 is transmitted to the third wrist element 58 by a driven-side bevel gear 91 fixed to the third wrist element 58, thus rotating the third wrist element 58 about the sixth axis N with respect to the second wrist element 57.

The third wrist element 58 is formed in a cylindrical shape having, at a distal end thereof, a flange 92 to which an end effector is fixed and having a hollow section 93 that penetrates along the sixth axis N.

The operation of the structure of the thus-configured robot 1 of this embodiment will be described below.

According to the structure of the robot 1 of this embodiment, in order to rotate the swivel body 3 with respect to the base 2, rotation from the drive motor 18 is speed-reduced by the transmission mechanism 19, which is constituted by the small gear 17 and the large gear 16. Furthermore, the rotation is again speed-reduced by the first hypoid gear set 8, which is constituted by the pinion gear 14 and the ring gear 9, and is transmitted to the swivel body 3. Accordingly, the swivel body 3 can be rotated about the vertical first axis A with high torque, with respect to the base 2.

Furthermore, in order to rotate the first arm 4 with respect to the swivel body 3, rotation from the drive motor 30, which is accommodated inside the first arm 4, is speed-reduced in two stages by the transmission mechanism 34 and the second hypoid gear set 21 and is transmitted to the swivel body 3. Accordingly, the first arm 4 can be rotated about the horizontal second axis B with high torque, with respect to the swivel body 3.

Furthermore, in order to rotate the second arm 5 with respect to the first arm 4, rotation from the drive motor 46, which is accommodated inside the first arm 4, is speed-reduced in two stages by the transmission mechanism 52 and the third hypoid gear set 37 and is transmitted to the second arm 5. Accordingly, the second arm 5 can be rotated about the horizontal third axis C with high torque, with respect to the first arm 4.

Furthermore, in order to rotate the first wrist element 56 with respect to the second arm 5, rotation from the drive motor 64, which is accommodated inside the first arm 4, is speed-reduced in two stages by the transmission mechanism 67 and the fourth hypoid gear set 40 and is transmitted to the first wrist element 56. Accordingly, the first wrist element 56 can be rotated about the fourth axis D with high torque, with respect to the second arm 5.

In each of the transmission mechanisms 34, 52, and 67, rotation is speed-reduced by engagement of one or more pairs of gears, formed of spur gear 28, 29, 32, 33, 48, 49, 50, 51, 65, and 66; thus, there is an advantage in that it is easy to adjust the engagement and to prevent the occurrence of axial forces in the axial directions of the shafts of the drive motors 30, 46, and 64 and the pinion gears 26, 44, and 62.

Figure 9:
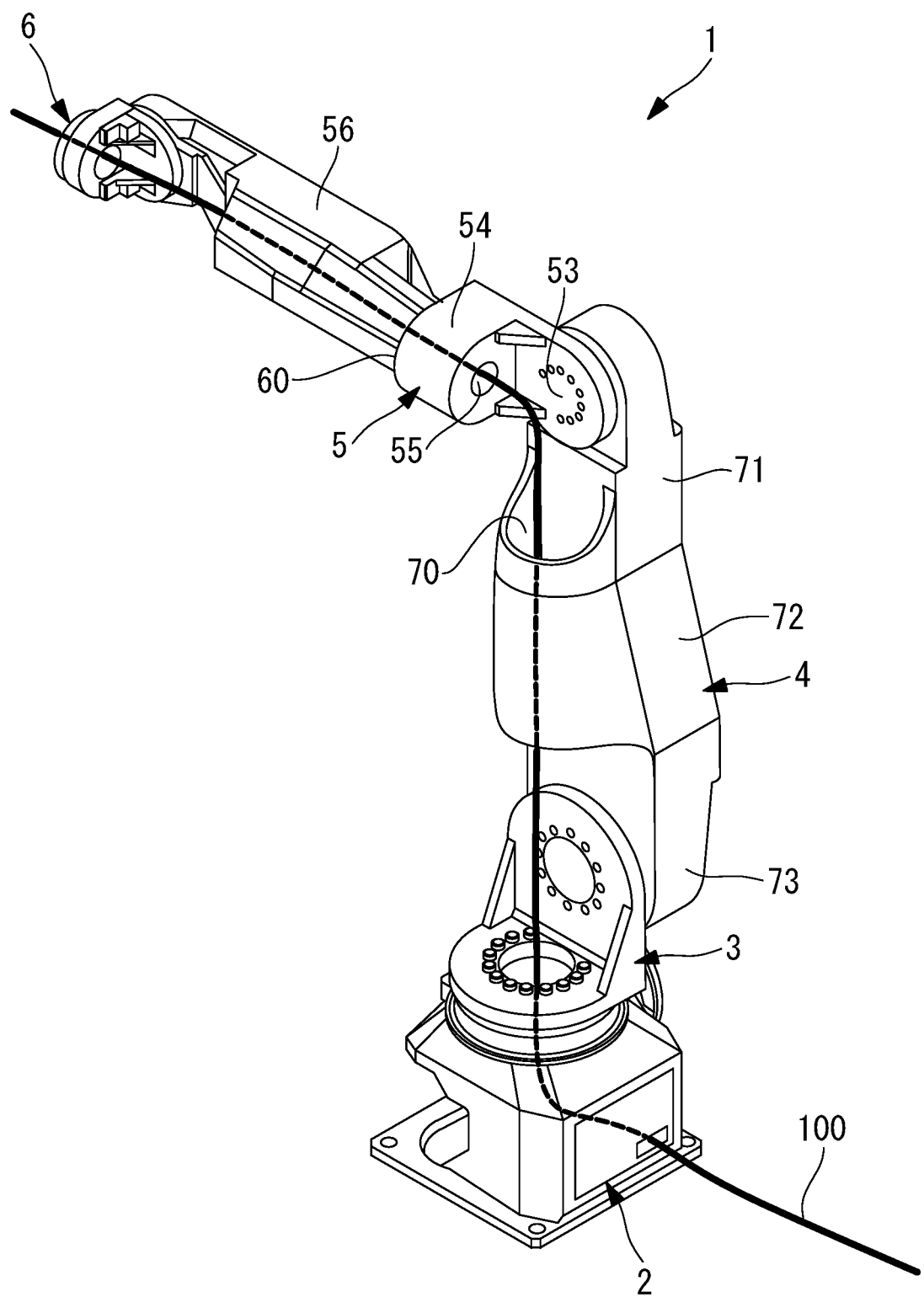
FIG. 9 is a perspective view showing a state in which wire bodies are wired in the robot shown in FIG. 1, when the robot is viewed from the left back side.

FIG. 9 shows a state in which wire bodies 100 guided from the base 2 to the distal end of the wrist unit 6 are incorporated. Although support members for supporting the wire bodies 100 are not shown in the figures, it is also possible to dispose the minimum necessary number of support members at appropriate places to support the wire bodies 100.

According to the structure of the robot 1 of this embodiment, the swivel body 3 is rotated about the first axis A with respect to the base 2, the first arm 4 is rotated about the second axis B with respect to the swivel body 3, and the second arm 5 is rotated about the third axis C with respect to the first arm 4. Accordingly, the wrist unit 6, which is attached to the second arm 5, can be disposed at a desired position in 3D space.

In this case, the wire bodies 100, such as a cable required to drive the robot 1, a cable or a tube required to drive an end effector mounted on the robot 1, etc., are inserted into the base 2 from outside the robot 1. The wire bodies 100 penetrate the first hollow section 70 from the inside of the base 2, pass through a space extending along a straight line connecting the intersection of the first axis A and the second axis B to the intersection of the third axis C and the fourth axis D, and are guided to the inside of the through-hole 55, which is provided in the second section 54 of the second arm 5.

Specifically, the wire bodies 100 penetrate the first hollow section 70, extend along the longitudinal direction of the first arm 4 from a position where the wire bodies 100 cross the second axis B, and are guided to the second hollow section 60 via a position where the wire bodies 100 cross the third axis C. Accordingly, winding wiring is not necessary, thereby making it possible to achieve a reduction in the lengths of the wire bodies 100 and simplification of installation work of the wire bodies 100.

More specifically, in the base 2 and the swivel body 3, the wire bodies 100 penetrate the first hollow section 70 along the first axis A, which is the center of rotation of the swivel body 3, and reach the position where the wire bodies 100 cross the second axis B. Accordingly, even though large extra lengths are not given, the wire bodies 100 can follow the rotation of the swivel body 3, which is rotated over a wide range with respect to the base 2, without receiving an excessive load.

Furthermore, in a region from the swivel body 3 to the first arm 4, the wire bodies 100 pass through the position where the wire bodies 100 cross the second axis B, which is the center of rotation of the first arm 4. Accordingly, even though large extra lengths are not given, the wire bodies 100 can follow the rotation of the first arm 4, which is rotated over a wide range with respect to the swivel body 3, without receiving an excessive load.

Furthermore, in a region from the first arm 4 to the second arm 5, the wire bodies 100 pass from the position where the wire bodies 100 cross the second axis B, to the first hollow section 70, which is provided in the first arm 4, and then pass through the position where wire bodies 100 cross the third axis C, which is the center of rotation of the second arm 5. Accordingly, because the wire bodies 100 are maintained inside the first hollow section 70 of the first arm 4 when the first arm 4 and the second arm 5 are operated, the wire bodies 100 can be prevented from moving violently. Furthermore, even though large extra lengths are not given, the wire bodies 100 can follow the rotation of the second arm 5, which is rotated over a wide range with respect to the first arm 4, without receiving an excessive load.

Furthermore, the wire bodies 100 pass through the second hollow section 60, which is provided in the first wrist element 56. Because the second hollow section 60 is provided along the fourth axis D, which is the center of rotation of the first wrist element 56, even though large extra lengths are not given, the wire bodies 100 can follow the rotation of the first wrist element 56, which is rotated over a wide range with respect to the second arm 5, without receiving an excessive load.

Specifically, among the wire bodies 100, cables required to drive the second wrist element 57 and the third wrist element 58 are introduced to the outside of the cylindrical member 61, which is inserted into the second hollow section 60, are spirally wired along an outer surface of the cylindrical member 61, and are then connected to the two drive motors 74 and 75 inside the first wrist element 56.

Furthermore, among the wire bodies 100, a cable, a tube, or the like required to drive the end effector passes through the inside of the cylindrical member 61 in the longitudinal direction, crosses the fifth axis M, passes through the hollow section 93, which is provided in the third wrist element 58, and is guided to the end effector.

In this way, according to the robot 1 of this embodiment, large cross-sectional paths and less-curved paths are secured as paths for the wire bodies 100. Therefore, it is possible to easily wire a plurality of relatively thick wire bodies 100, for example, a control cable, a gas hose, a wire conduit, a power supply cable, etc.

In particular, according to the robot 1 of this embodiment, the first axis A and the second axis B are made perpendicular to each other at one point, the third axis C and the fourth axis D are made perpendicular to each other at one point, and the first axis A and the fourth axis D are disposed in the same plane. Specifically, there is no offset between the first axis A and the second axis B in the swivel body 3, and there is no offset between the third axis C and the fourth axis D in the second arm 5.

Figure 10:
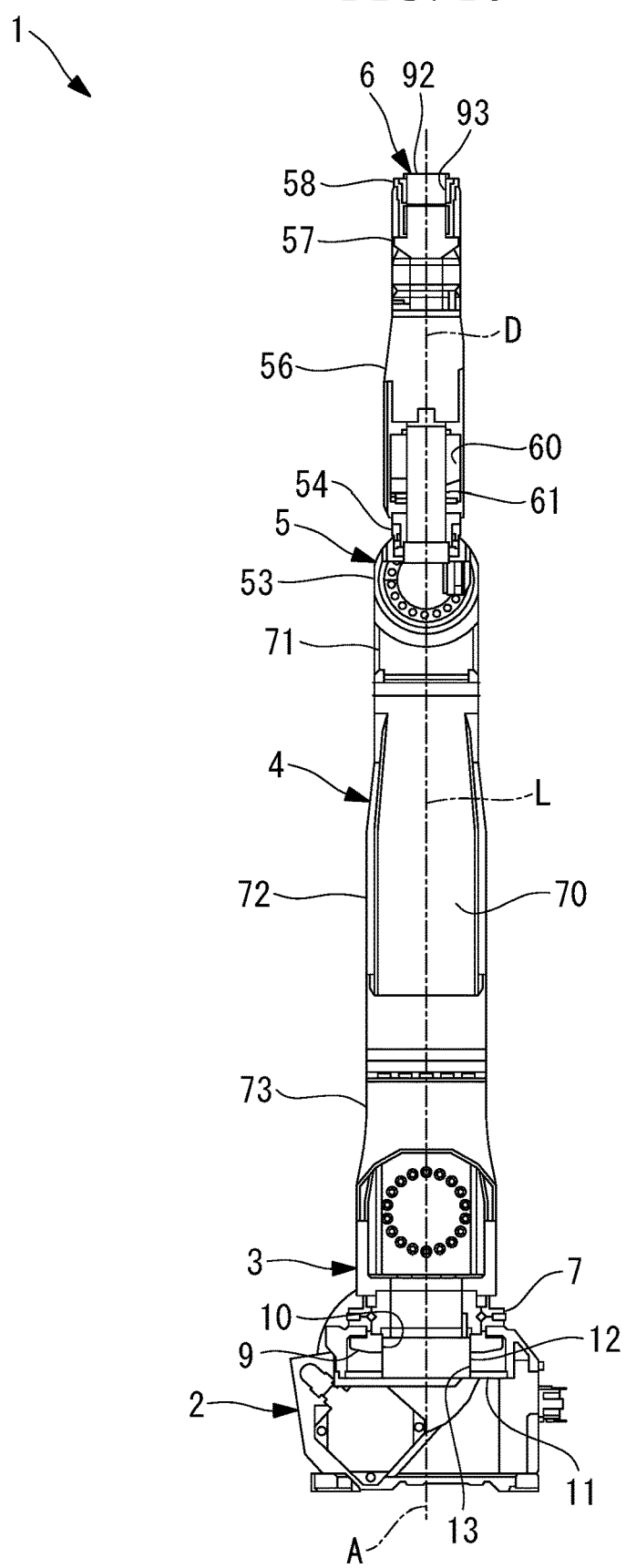
FIG. 10 is a side view of the robot in a state in which the first arm and the second arm of the robot shown in FIG. 1 are extended in the vertical direction, the robot being viewed from the left side.
Figure 11:
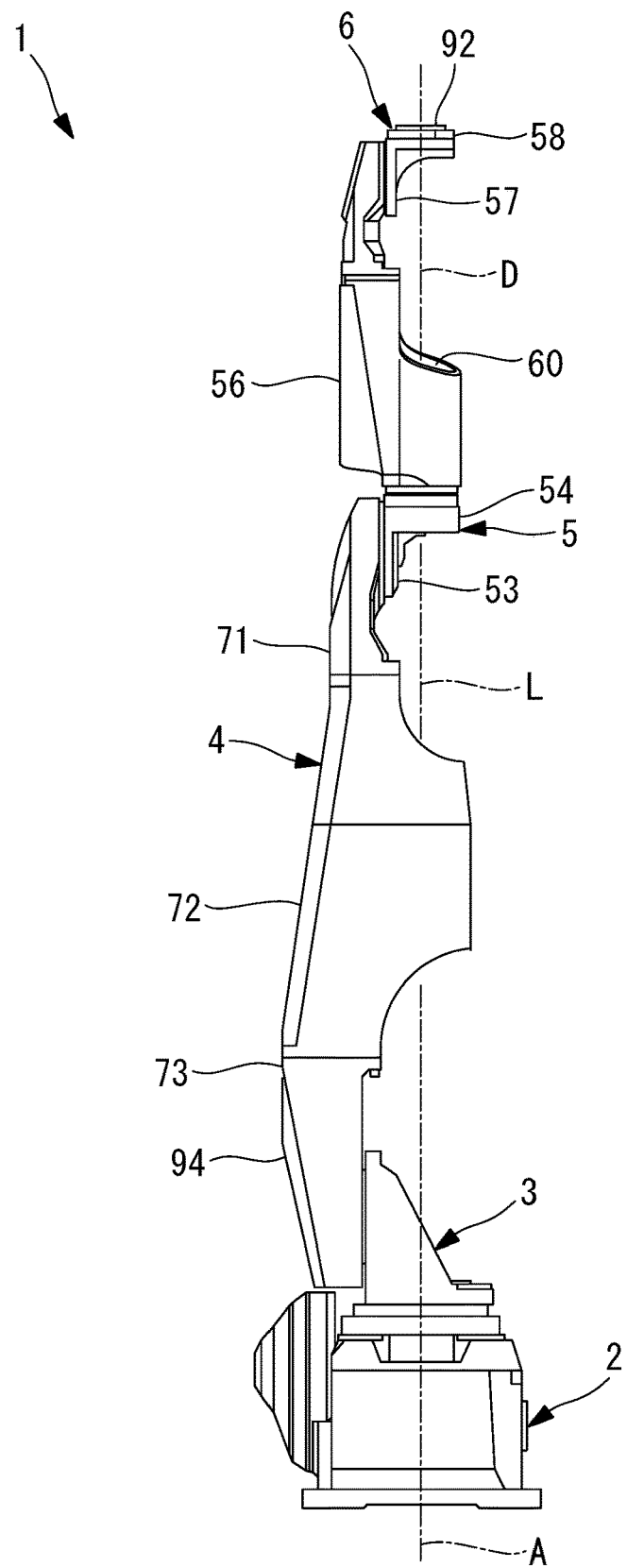
FIG. 11 is a front view of the robot shown in FIG. 10.

Therefore, as shown in FIGS. 10 and 11, when the robot 1 is set in an orientation in which the first arm 4 and the second arm 5 are disposed along the vertical direction, as shown in FIG. 11, the first axis A and the fourth axis D are disposed in one straight line. Then, the wire bodies 100 are almost disposed along this straight line.

Specifically, if it is assumed that the robot 1 is in the state of FIG. 10, the wire bodies 100 are subjected to equal deformation no matter whether the first arm 4 is rotated about the second axis B in a clockwise direction or in a counterclockwise direction. Furthermore, the wire bodies 100 are subjected to equal deformation no matter whether the second arm 5 is rotated about the third axis C in a clockwise direction or in a counterclockwise direction.

Then, even though large extra lengths are not given, the wire bodies 100 can follow the operation of the first arm 4 and the operation of the second arm 5 without receiving an excessive load, regardless of the directions of the rotation of the first arm 4 about the second axis B and the directions of the rotation of the second arm 5 about the third axis C.

Therefore, there is an advantage in that it is possible to operate the first arm 4 and the second arm 5 in wide operation ranges, to prevent a situation in which the wire bodies 100 move violently when the robot 1 is operated, because large extra lengths are not given to the wire bodies 100, and to maintain the soundness of the movable wire bodies 100.

Furthermore, according to the robot 1 of this embodiment, not only the drive motor 46, which drives the second arm 5, but also the drive motor 64, which drives the first wrist element 56, is disposed inside the first arm 4. Furthermore, the pair of input hypoid gears 44 and 62 and the pair of transmission mechanisms 52 and 67, which speed-reduce the rotations of the drive motors 46 and 64, respectively, are also accommodated inside the first arm 4. Accordingly, it is possible to dispose heavy components, such as the drive motors 46 and 64 and the transmission mechanisms 52 and 67, close to the second axis B, and to reduce the loads on the drive motors 46 and 64, which drive the swivel body 3, the first arm 4, and the second arm 5.

Note that, in this embodiment, although a description has been given of the example robot 1 in which there is no offset between the first axis A and the second axis B in the swivel body 3, and there is no offset between the third axis C and the fourth axis D in the second arm 5, the present invention is not limited to this, there may be an offset therebetween.

In this case, the wire bodies 100 are subjected to different deformation depending on the directions of rotation of the first arm 4 and the second arm 5. However, in this case, the soundness of the movable wire bodies 100 can be maintained even though large extra lengths are not given thereto.

The invention claimed is:

1. A robot comprising:
    a base that is fixed to an installation surface;
    a swivel body that is supported so as to be rotatable about a first axis with respect to the base;
    a first arm that is supported so as to be rotatable about a second axis perpendicular to the first axis, with respect to the swivel body;
    a second arm that is supported so as to be rotatable about a third axis parallel to the second axis, with respect to the first arm; and
    a first wrist element that is supported so as to be rotatable about a fourth axis perpendicular to the third axis and disposed in a same plane as the first axis, with respect to the second arm,
    wherein a first hollow section that penetrates along the first axis is provided in the base and the swivel body;
    a second hollow section that penetrates along the fourth axis is provided in the first wrist element;
    the first arm and the second arm have shapes that allow a linear object that has passed through the first hollow section to be guided to the second hollow section via a space extending along a straight line that connects an intersection of the first axis and the second axis and an intersection of the third axis and the fourth axis;
    two drive motors that generate power for rotating the second arm with respect to the first arm and generate power for rotating the first wrist element with respect to the second arm; and
    two reducer mechanisms that reduce speed of rotations of the respective drive motors and that transmit the rotations to the second arm and the first wrist element, respectively,
    wherein the reducer mechanisms comprise: a pair of output hypoid gears that are formed of ring gears coaxially disposed so as to be rotatable about the third axis; a pair of input hypoid gears that are engaged with the output hypoid gears; and a pair of transmission mechanisms that transmit the rotations from the drive motors to the input hypoid gears while reducing speed of the rotations;
    one of the output hypoid gears is fixed to the second arm; and
    an other one of the output hypoid gears is fixed to a drive-side bevel gear that is engaged with a driven-side bevel gear fixed to the first wrist element.

2. The robot according to claim 1, wherein the two drive motors, the pair of input hypoid gears, and the pair of transmission mechanisms are supported inside the first arm in an accommodated state.

3. The robot according to claim 1, wherein the transmission mechanisms comprise small gears that are fixed to shafts of the drive motors and large gears that are engaged with the small gears.

4. The robot according to claim 3, wherein the large gears and the small gears are spur gears.

5. The robot according to claim 1,
    wherein the first arm includes a first arm section and a second arm section that are detachably joined to each other in a longitudinal direction;
    the first arm section rotatably supports the second arm and supports the pair of input hypoid gears so as to be rotatable about axes parallel to the straight line;
    the second arm section supports the two drive motors; and
    when the first arm section and the second arm section are joined to each other, the transmission mechanisms are coupled and transmit the rotations of the drive motors to the input hypoid gears.

6. A robot comprising:
    a base that is fixed to an installation surface;
    a swivel body that is supported so as to be rotatable about a first axis with respect to the base;
    a first arm that is supported so as to be rotatable about a second axis perpendicular to the first axis, with respect to the swivel body;
    a second arm that is supported so as to be rotatable about a third axis parallel to the second axis, with respect to the first arm; and
    a first wrist element that is supported so as to be rotatable about a fourth axis perpendicular to the third axis and disposed in a same plane as the first axis, with respect to the second arm,
    wherein a first hollow section that penetrates along the first axis is provided in the base and the swivel body;
    a second hollow section that penetrates along the fourth axis is provided in the first wrist element;
    the first arm and the second arm have shapes that allow a linear object that has passed through the first hollow section to be guided to the second hollow section; and
    the linear object is disposed along a straight line passing through the first axis and the fourth axis when the first axis and the fourth axis are coaxially disposed.

7. The robot according to claim 6, further comprising:
    two drive motors that generate power for rotating the second arm with respect to the first arm and generate power for rotating the first wrist element with respect to the second arm; and
    two reducer mechanisms that reduce speed of rotations of the respective drive motors and that transmit the rotations to the second arm and the first wrist element, respectively,
    wherein the reducer mechanisms comprise: a pair of output hypoid gears that are formed of ring gears coaxially disposed so as to be rotatable about the third axis; a pair of input hypoid gears that are engaged with the output hypoid gears; and a pair of transmission mechanisms that transmit the rotations from the drive motors to the input hypoid gears while reducing speed of the rotations;

one of the output hypoid gears is fixed to the second arm; and an other one of the output hypoid gears is fixed to a drive-side bevel gear that is engaged with a driven-side bevel gear fixed to the first wrist element.

8. The robot according to claim 7, wherein the two drive motors, the pair of input hypoid gears, and the pair of transmission mechanisms are supported inside the first arm in an accommodated state.

9. The robot according to claim 7, wherein the transmission mechanisms comprise small gears that are fixed to shafts of the drive motors and large gears that are engaged with the small gears.

10. The robot according to claim 9, wherein the large gears and the small gears are spur gears.

11. The robot according to claim 7,
wherein the first arm includes a first arm section and a second arm section that are detachably joined to each other in a longitudinal direction;
the first arm section rotatably supports the second arm and supports the pair of input hypoid gears so as to be rotatable about axes parallel to the straight line;
the second arm section supports the two drive motors; and
when the first arm section and the second arm section are joined to each other, the transmission mechanisms are coupled and transmit the rotations of the drive motors to the input hypoid gears.

* * * * *